(12) United States Patent
Wallinger et al.

(10) Patent No.: US 12,048,069 B2
(45) Date of Patent: Jul. 23, 2024

(54) THERMAL SYSTEM WITH A TEMPERATURE LIMITING DEVICE

(71) Applicant: Watlow Electric Manufacturing Company, St. Louis, MO (US)

(72) Inventors: Martin Wallinger, Abtenau (AT); Julian Michelsen, Scheffau am Tennengebirge (AT)

(73) Assignee: Watlow Electric Manufacturing Company, St. Louis, MO (US)

(*) Notice: Subject to any disclaimer, the term of this patent is extended or adjusted under 35 U.S.C. 154(b) by 698 days.

(21) Appl. No.: 16/844,219

(22) Filed: Apr. 9, 2020

(65) Prior Publication Data

US 2020/0329533 A1  Oct. 15, 2020

Related U.S. Application Data

(60) Provisional application No. 62/831,619, filed on Apr. 9, 2019.

(51) Int. Cl.
*H05B 3/00* (2006.01)
*G05D 23/24* (2006.01)
*H05B 1/02* (2006.01)

(52) U.S. Cl.
CPC ........ *H05B 3/0019* (2013.01); *G05D 23/2451* (2013.01); *H05B 1/0297* (2013.01); *H05B 3/0014* (2013.01); *H05B 2203/005* (2013.01)

(58) Field of Classification Search
CPC .............. G05D 23/2451; H05B 1/0227; H05B 1/0297; H05B 2203/005; H05B 3/0014; H05B 3/0019
See application file for complete search history.

(56) References Cited

U.S. PATENT DOCUMENTS

| 7,196,295 B2 | 3/2007 | Fennewald et al. |
| 2003/0154004 A1* | 8/2003 | Kroeger ............. G05D 23/1934 700/202 |

(Continued)

FOREIGN PATENT DOCUMENTS

| EP | 0745919 | 12/1996 |
| JP | S53046173 U | 4/1978 |
| JP | 2018516436 A | 6/2018 |

OTHER PUBLICATIONS

International Search Report for International Application PCT/US2020/027405, mailed Jun. 30, 2020.

(Continued)

*Primary Examiner* — Dana Ross
*Assistant Examiner* — Joe E Mills, Jr.
(74) *Attorney, Agent, or Firm* — Burris Law, PLLC (57) ABSTRACT

A temperature limiting device for a thermal system includes a modular unit that is configured to connect to a two-wire heater of the thermal system. More particularly, the modular unit includes a heater interface configured to connect to a two-wire heater of the thermal system, a power interface configured to connect to a power source to receive power; and a controller including a sensor circuit. The sensor circuit is configured to measure an electrical characteristic of the two-wire heater, which includes voltage, current, or a combination thereof. The controller is configured to calculate a temperature of the thermal system based on the measured electrical characteristic and determine whether the temperature is greater than a temperature setpoint.

20 Claims, 7 Drawing Sheets

(56) References Cited

U.S. PATENT DOCUMENTS

| | | |
|---|---|---|
| 2005/0109767 A1 | 5/2005 | Fennewald et al. |
| 2011/0056986 A1* | 3/2011 | Shank .................... B05B 9/002 |
| | | 222/146.2 |
| 2011/0192832 A1* | 8/2011 | Biller ....................... H05B 3/12 |
| | | 219/494 |
| 2013/0248511 A1 | 9/2013 | Wallinger |
| 2014/0217087 A1 | 8/2014 | Biller |
| 2016/0353521 A1 | 12/2016 | Reynolds et al. |
| 2018/0235028 A1 | 8/2018 | Colhour et al. |

OTHER PUBLICATIONS

Office Action issued in corresponding JP Application No. 2021-559876, issued Apr. 2, 2024, and an English Translation, 11 pages.

\* cited by examiner

THERMAL SYSTEM WITH A TEMPERATURE LIMITING DEVICE

CROSS-REFERENCE TO RELATED APPLICATIONS

This application claims priority to U.S. provisional application No. 62/831,619 filed on Apr. 9, 2019. The disclosure of the above application is incorporated herein by reference.

FIELD

The present disclosure relates to an apparatus for controlling power to a two-wire heater.

BACKGROUND

The statements in this section merely provide background information related to the present disclosure and may not constitute prior art.

Resistive heaters are used in a variety of applications to provide heat to a load. Such heaters include but are not limited to layered heaters, tubular heaters, cartridge heaters, or other suitable heaters. In order to determine the proper temperature at which the heater should be operating, discrete temperature sensors, such as thermocouples, are placed on or near the heater. Adding discrete temperature sensors to the heater and its environment can be costly and add complexity to the overall heating system.

SUMMARY

This section provides a general summary of the disclosure and is not a comprehensive disclosure of its full scope or all of its features.

The present disclosure provides a temperature limiting device for a thermal system. The temperature limiting device includes a modular unit. The modular unit includes a heater interface configured to connect to a two-wire heater of the thermal system. The modular unit includes a power interface configured to connect to a power source to receive power. The modular unit includes a controller including a sensor circuit. The sensor circuit is configured to measure an electrical characteristic of the two-wire heater, where the electrical characteristic includes voltage, current, or a combination thereof. The controller is configured to calculate a temperature of the thermal system based on the measured electrical characteristic and determine whether the temperature is greater than a temperature setpoint.

In some forms, the modular unit further includes a power switch interface to connect to a power switch at the thermal system, and the controller is configured to operate the power switch to turn off power to the two-wire heater in response to the temperature of the thermal system being greater than the temperature setpoint.

In some forms, the modular unit further comprises a power switch electrically coupled between the power interface and the heater interface and operable by the controller to control power to the two-wire heater.

In some forms, the controller is configured to turn off power to the two-wire heater via the power switch in response to the temperature of the thermal system being greater than the temperature setpoint.

In some forms, the controller stores predefined heater information that associates temperature values of the two-wire heater with performance characteristic measurements of the two-wire heater, where the controller is configured to determine a performance characteristic based on the measured electrical characteristic. In some forms, the controller is configured to determine, as the temperature of the thermal system, a temperature of the two-wire heater, a temperature of a load being heated by the two-wire heater, or a combination thereof based on the determined performance characteristic and the predefined heater information.

In some forms, the two-wire heater has a varying temperature coefficient of resistance, and the performance characteristic is a resistance of the two-wire heater at a temperature.

In some forms, the heater interface is connected to the two-wire heater by way of a temperature sensing power pins that define a temperature sensing junction at the heater, where the sensor circuit measures voltage at the temperature sensing junction and the performance characteristic is a change in voltage at the temperature sensing junction.

In some forms, the controller is configured to calculate, as the temperature of the thermal system, a temperature of the two-wire heater, a temperature of a load being heated by the two-wire heater, or a combination thereof.

The present disclosure also provides a thermal system that includes a two-wire heater including two terminals. The thermal system includes a process controller configured to control thermal performance of the two-wire heater based on data from one or more discrete sensors. The thermal system includes a power switch operable to provide power to the two-wire heater based on a control signal from the process controller. The thermal system includes a temperature limiting device separate from the process controller, where the temperature limiting device includes a modular unit. The modular unit includes a heater interface configured to connect to a two-wire heater of the thermal system. The modular unit includes a power interface configured to connect to a power source to receive power. The modular unit includes a controller including a sensor circuit. The sensor circuit is configured to measure an electrical characteristic of the two-wire heater, where the electrical characteristic includes voltage, current, or a combination thereof. The controller is configured to calculate a temperature of the thermal system based on the measured electrical characteristic and determine whether the temperature is greater than a temperature setpoint. The controller is configured to operate the power switch to turn-off power to the two-wire heater in response to the temperature of the thermal system being greater than the temperature setpoint.

In some forms, the controller of the temperature limiting device stores predefined heater information that associates temperature values of the two-wire heater with performance characteristic measurements of the two-wire heater, where the controller is configured to determine a performance characteristic based on the measured electrical characteristic. In some forms, the controller is configured to determine, as the temperature of the thermal system, a temperature of the two-wire heater, a temperature of a load being heated by the two-wire heater, or a combination thereof based on the determined performance characteristic and the predefined heater information.

In some forms, the two-wire heater has a varying temperature coefficient of resistance, and the performance characteristic is a resistance at a temperature of the two-wire heater.

In some forms, the two terminals of the two-wire heater include temperature sensing power pins that define a temperature sensing junction, and the sensor circuit is configured to measure voltage at the temperature sensing junction and the performance characteristic as a change in voltage at the temperature sensing junction.

In some forms, the temperature limiting device is coupled in series with the process controller and the power switch, and the temperature limiting device is configured to transfer the control signal from the process controller to the power switch.

In some forms, the temperature limiting device is arranged in parallel with the power switch to detect the electrical characteristic of the two-wire heater.

In some forms, the modular unit includes the power switch.

In some forms, the two-wire heater is an in-line heater that heats fluid flowing therein. In some forms, the power switch is disposed at and integrated with the in-line heater to transfer heat to the fluid flowing in the in-line heater. In some forms, the temperature limiting device is disposed separately from the two-wire heater and the power switch, and the modular unit includes a power switch interface to connect to the power switch.

In some forms, the thermal system includes a thermal cut-off circuit including a relay coupled to a power line to the two-wire heater. In some forms, the thermal system includes a discrete sensor. The two-wire heater is a layered heater that has a resistive heating layer. The discrete sensor is configured to measure a temperature of the heater. The thermal cut-off circuit is configured to turn-off power to the two-wire heater via the relay when the temperature of the heater is greater than a cut-off temperature setpoint.

The present disclosure provides a temperature limiting device for a thermal system. The temperature limiting device includes a modular unit. The modular unit includes a heater interface configured to connect to a two-wire heater of the thermal system. The modular unit includes a power interface configured to connect to a power source to receive power. The modular unit includes a power switch disposed between the heater interface and the power interface to control power to the two-wire heater. The modular unit includes a controller including a sensor circuit, where the sensor circuit is configured to measure an electrical characteristic of the two-wire heater, wherein the electrical characteristic includes voltage, current, or a combination thereof. The controller is configured to calculate a temperature of the thermal system based on the measured electrical characteristic and predefined heater information, determine whether the temperature is greater than a temperature setpoint, and turn off power to the two-wire heater via the power switch in response to the temperature of the thermal system being greater than the temperature setpoint.

In some forms, the controller is configured to calculate, as the temperature of the thermal system, a temperature of the two-wire heater, a temperature of a load being heated by the two-wire heater, or a combination thereof.

In some forms, the controller is configured to operate in a temperature limiting mode to turn-off power to the two-wire heater when the temperature of the thermal system is greater than the temperature setpoint and in a temperature control mode to selectively apply power to the two-wire heater via the power switch to control the temperature of the thermal system to a temperature control setpoint.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

A two-wire thermal system includes a two-wire heater that uses two wires (i.e., two power lines) for not only providing power to a resistive heating element of the heater to generate heat, but to measure a performance characteristic (s) of the resistive heating element (e.g., current, voltage, resistance, power, and/or temperature). In one form, the "two-wire" heater includes one or more resistive heating elements defined by a material whose resistance changes with temperature. The temperature coefficient of resistance (TCR) of the material is known and should be large and stable over a wide temperature range and load cycle to allow reliable measurements. Such a two-wire system is disclosed in U.S. Pat. No. 7,196,295, which is commonly owned with the present application and the contents of which are incorporated herein by reference in its entirety. The system is an adaptive thermal system that merges heater designs with controls that incorporate power, resistance, voltage, and current in a customizable feedback control system that limits one or more these parameters (i.e., power, resistance, voltage, current) while controlling another.

In another form, the two-wire heater may include temperature sensing power pins that provide power to a resistive heating element of the two-wire heater and also measure temperature via a thermocouple defined by the temperature sensing power pins. Details regarding the temperature sensing power pins is provided below. In the following, a two-wire heater may be configured as a heater having a varying resistance-to-temperature correlation, which may be referred to as a "R-T heater", or a heater having a temperature sensing power pins, which may be referred to as a "TSPP heater."

In one form, the present disclosure describes a temperature limiting device for controlling power to a two-wire heater based on a performance characteristic of the two-wire heater and/or a temperature of the thermal system. The temperature limiting device of the present disclosure is configured to be an adaptable control device that can be used in existing and new thermal systems having two-wire heaters. The temperature limiting device is configured to: turn-off power to the two-heater in the event the temperature of the two-wire heater exceeds a threshold; control the temperature of the heater to a controlled temperature setpoint by selectively turning power on/off to the heater; perform a diagnostic control to determine if one or more performance characteristics of the heater exceed a respective threshold and perform a corrective action if the threshold is exceeded; operate as a safety relevant device in conjunction with a secondary safety mechanism; estimate temperature of a load being heated by the two-wire heater using a known heater-load offset; operate with a process controller performing a closed-loop control and interrupt power to the heater when the temperature of the thermal system exceeds a threshold; and have a power switch operable by the temperature limiting device disposed with a heater to cool the power switch and heat the fluid flowing through the heater. While specific operations are listed, the temperature limiting device may perform other operations as described further herein.

Figure 1:
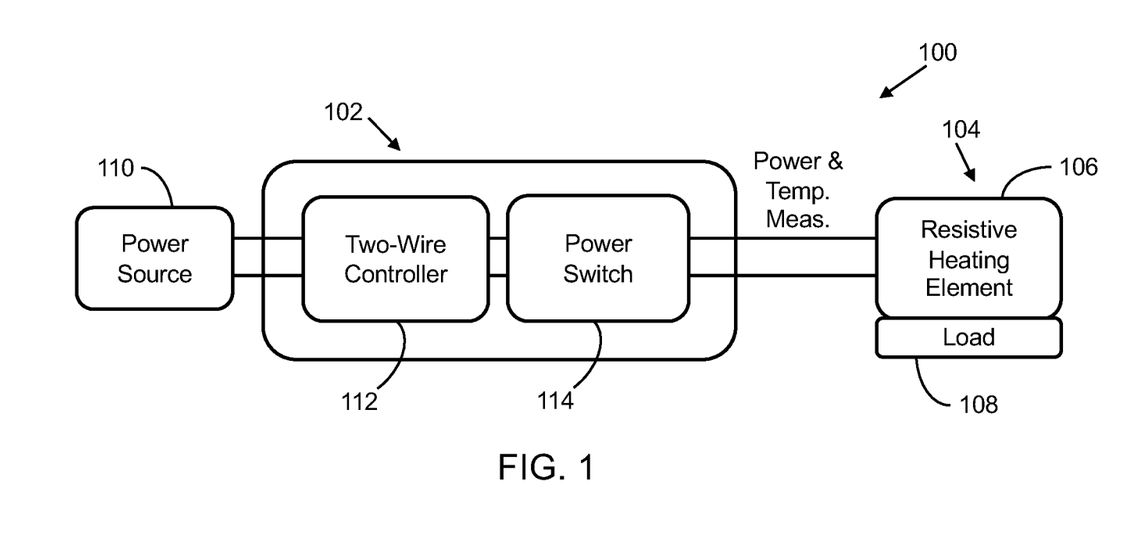
FIG. 1 illustrates a first form of a thermal system having a temperature limiting device for a two-wire heater in accordance with the teachings of the present disclosure.

Referring to FIG. 1, a thermal system 100 includes a temperature limiting device 102 and a two-wire heater 104 having one or more resistive heating elements 106 for heating a load 108. In one form, the temperature limiting device 102 is connected to a power source 110 (e.g., a 230 VAC) that provides power for the temperature limiting device 102 and the two-wire heater 104. The temperature limiting device 102 includes a two-wire controller (TWC) 112 and a power switch 114 that is operable by the TWC 112 to shut-off power to the two-wire heater 104. In one form, the power switch 114 may be a thyristor (e.g., a TRIAC). As provided herein, the power switch 114 may be disposed and integrated as part of the temperature limiting device 102, as illustrated in FIG. 1. Alternatively, the power switch 114 may be disposed external of the temperature limiting device 102.

In one form, the TWC 112 is configured to monitor the temperature of the thermal system 100 based on an electrical characteristic of the resistive heating element 106, such as electric current and/or voltage. In one form, the temperature of the thermal system 100 may include a temperature of the two-wire heater 104 (i.e., resistive heating element 106) and/or a temperature of the load 108. In one form, based on the electrical characteristic of the resistive heating element 106 and predefined heater information, the TWC 112 is configured to determine a performance characteristic of the resistive heating element 106 (i.e., the two-wire heater 104), which is then used to determine to the temperature of the thermal system 100. The predefined heater information includes information that associates temperature values of the two-wire heater 104 with performance characteristic measurements of the two-wire heater 104. For example, the performance characteristic for a R-T heater may include resistance and/or temperature, and the heater information may include a R-T curve/look-up table for determining a temperature of the two-wire heater 104 based on a calculated resistance, the TCR of the material defining the resistive heating element 106, and/or predefined algorithms. For a TSPP heater, the performance characteristic determined by the TWC 112 includes a voltage and/or a voltage change and the heater information includes information that associates the voltage/voltage change with a temperature of the two-wire heater 104.

To determine a temperature of the load 108, the heater information may further include a thermal offset. That is, the temperature of the resistive heating element 106 or a surface of the two-wire heater 104 is typically greater than that of the load 108. The difference between the two temperatures is provided as a thermal offset, which can be predefined based on various controlled experiments, and used to determine the temperature of the load 108, as the temperature of the thermal system 100. If the thermal offset is provided, the TWC 112 may estimate the temperature of the load 108 by subtracting the thermal offset from the calculated temperature of the two-wire heater 104 (i.e., $T_L = T_H - T_O$, wherein $T_L$ is the thermal load temperature, $T_H$ is heater temperature, and $T_O$ is thermal offset). Accordingly, in one form, the TWC 112 may turn-off power to the two-wire heater 104 based on the heater temperature and/or the thermal load temperature.

As an example, for the R-T heater, the TWC 112 is configured to measure, as electrical characteristics, voltage and/or current applied to the resistive heating element 106. Based on the measured electrical characteristics and predefined resistance-temperature information for the resistive heating element 106, the TWC 112 determines a resistance and then a temperature of the resistive heating element 106, as the performance characteristics. As part of a temperature limiter process, the TWC 112 then determines if the temperature of the resistive heating element 106 is above a temperature setpoint (i.e., a temperature limit setpoint). If so, the TWC 112 turns off power to the resistive heating element 106 via the power switch 114. If not, the temperature limiting device 102 continues to provide power to the resistive heating element 106. Alternatively, the TWC 112, may determine the temperature of the load 108 based on a predefined thermal offset and control power to the two-wire heater 104 based on the temperature of the load 108. Accordingly, the temperature limiting device 102 operates as a safety mechanism for inhibiting or reducing damage to the two-wire heater 104 in the event of an abnormal performance of the two-wire heater 104 (e.g., temperature above or below a threshold set for inhibiting damage to the two-wire heater 104). In the following, by performing the temperature limiter process described herein, the TWC 112 is operating in a temperature limiter mode.

In one form, the TWC 112 is configured to perform a temperature control process (i.e., operate in a temperature control mode) in which the TWC 112 maintains the temperature of the two-wire heater 104 at a controlled temperature setpoint. In such configuration, the TWC 112 determines the temperature of the thermal system 100, as described above, and turns-off power to the resistive heating element 106 when the temperature exceeds the controlled temperature setpoint, but routinely monitors the temperature of thermal system 100. For example, for the R-T heater, the TWC 112 is configured to calculate the resistance of the resistive heating element 106 at a positive sine wave. Using the resistance and predefined heater information (e.g., R-T curve/look table, TCR characteristics), the TWC 112 determines a temperature of the resistive heating element 106 and compares it to the controlled temperature setpoint. If the temperature of the resistive heating element 106 exceeds the temperature control setpoint, power to the two-wire heater 104 is turned off at zero crossing of the VAC. Once the temperature is reduced to a value below the controlled temperature setpoint, the TWC 112 applies power to the resistive heating element 106 to generate heat.

In one form, the TWC 112 is configured perform a diagnostic process to control power to the two-wire heater 104 based on one or more performance characteristics, which may include temperature, voltage, current, power, and/or resistance. More particularly, if the determined performance characteristic exceeds a respective diagnostic threshold, the TWC 112 determines that the two-wire heater 104 is performing abnormally and turns-off power to the two-wire heater 104. For example, if the voltage and/or current of the two-wire heater 104 exceeds an associated diagnostic threshold, the temperature limiting device 102 turns-off power to the two-wire heater 104, as a corrective correction. The diagnostic threshold(s) for a respective performance characteristic may be a single predefined value or set based on the process being performed. For example, a different diagnostic threshold may be set when the two-wire heater 104 is operating at steady-state verses during warm-up. Thus, in addition to or in lieu of the temperature limiter mode, the TWC 112 may include a diagnostic mode to perform the operation described above. Like the temperature limiter mode and the temperature control mode, the diagnostic mode may be a standard mode available and selectable by the user. In addition, the various setpoints/thresholds used by the temperature limiter mode, the temperature control mode, and the diagnostic mode may be the same or different.

In one form, The TWC 112 is configured to perform a calibration process (i.e., operate in a calibration mode) in which the user communicates with the TWC 112 via a human machine interface (e.g., computing device) to calibrate the heater information. More particularly, the heater information provided in the TWC 112 may be updated by uploading new heater information to the TWC 112 or manually calibrating the heater information provided in the TWC 112. In one example, for the manual calibration, a discrete temperature sensor such as an infrared camera is used to measure a temperature of the two-wire heater 104 and more specifically, a surface temperature of the two-wire heater 104. The TWC 112 calculates the temperature of the heater as described above and then compares the calculated temperature with the temperature measured by the discrete temperature sensor. The TWC 112 may perform such operation for one or more temperature calibration setpoints. Specifically, the TWC 112 applies power to the two-wire heater 104 and calculates the temperature of the two-wire heater 104. Once the temperature is equal to a selected temperature calibration setpoint, the TWC 112 acquires the temperature measured by the discrete temperature sensor. Based on the difference between the temperatures, the TWC 112 adjust the heater information, such as updating the R-T curve or TCR characteristics used for determining temperature.

As provided above, the TWC 112 may be configured to include one or more operation modes that include the temperature limiter mode, the temperature the control mode, the diagnostic mode, and/or the calibration mode. In one variation, the TWC 112 may be configured to perform both a temperature limiter process and a temperature control process during operation. In another variation, the TWC 112 may be configured to operate one or more modes, and if multiple modes are available, the user may select the mode to be performed via a human machine interface in communication with the temperature limiting device 102.

The temperature limiting device 102 of the present disclosure may improve the response time for turning-off power to the two-wire heater 104 when compared to a thermal system having discrete sensors because the temperature limiting device 102 directly measures and limits the temperature of the resistive heating element 106. Conversely, thermal systems with discrete sensors still require the sensor data to be processed by a process controller, which can delay power shut-off. In addition, the temperature limiting device 102 allows the use of high watt density, high performance heating elements even in applications where the whole thermal loop is not known or defined in detail. That is, in lieu of replacing an existing process controller when a two-wire heater is implemented, the temperature limiting device 102 of the present disclosure can be plugged into the existing thermal system 100. If the temperature limiting device 102 is used as a safety relevant device to inhibit severe conditions/failures (e.g. fire), the temperature limiting device 102 may include additional hardware and/or software to fulfill special requirements, such as a secondary safety mechanism.

Figure 2:
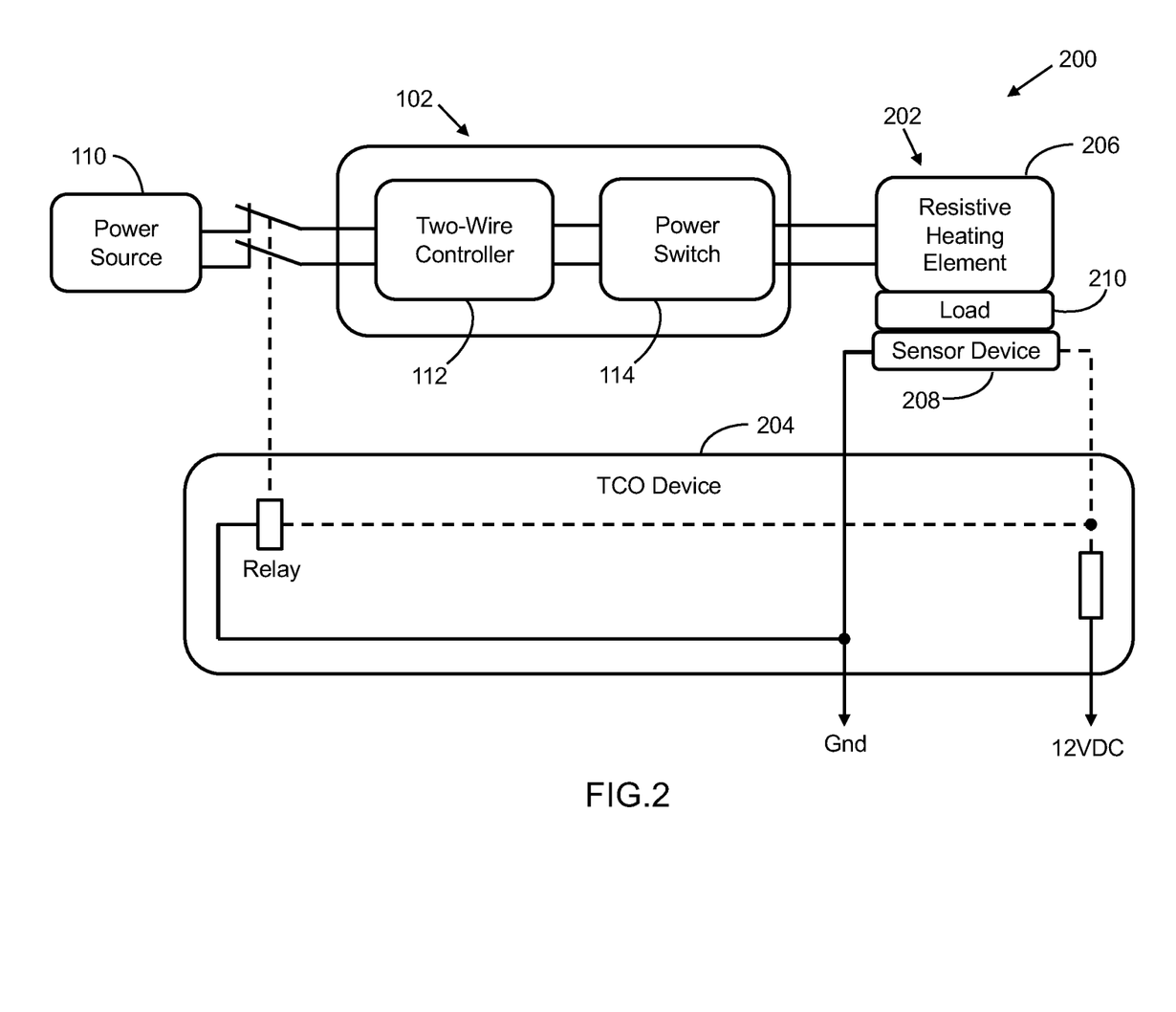
FIG. 2 illustrates a second form of a thermal system having a thermal cut-off device and the temperature limiting device of FIG. 1 in accordance with the teachings of the present disclosure.

One example thermal system that includes a secondary safety mechanism is provided in FIG. 2. In one form, a thermal system 200 includes the temperature limiting device 102, a heater 202, and a thermal cut-off (TCO) device 204. In one form, the heater 202 is a layered heater that has a resistive heating layer defining one or more of resistive heating elements 206 and a sensor layer defining a sensor device 208. Such a layered heater is described in U.S. Pat. No. 9,078,293, which is commonly assigned with the present application and the contents of which are incorporated by reference herein in its entirety. For such layered heater, the sensor device 208 is provided as a sensor layer made of material having a TCR from a relatively low value, such as 500 ppm/° C., to a relatively high value, such as 10,000 ppm/° C., and is used to measure the temperature of the load 210. It should also be understood that materials with a negative TCR, such as graphite, may also be used. The sensor device 208 may be configured to measure the temperature of the resistive heating elements 206 and/or the load 210. In lieu of the sensor layer, the sensor device 208 may be a discrete temperature sensor, such as thermocouple, resistance temperature detector, or infrared imaging, for measuring the temperature of the thermal load and/or heater 202.

The TCO device 204 is coupled to the sensor device 208 and turns-off power to the heater 202 in the event the temperature measured by the sensor device 208 exceeds a defined temperature threshold, which may be the same or different from the temperature setpoint controlled by the temperature limiting device 102. In one form, the TCO device 204 is an overtemperature detection circuit that is described in U.S. Pat. No. 9,078,293, and includes a divider circuit and a relay for turning off power to the heater 202. In another example, the TCO device 204 may be implemented using a combination of hardware and software to measure the temperature of the load/heater, compare the temperature to a threshold, and then operate the relay in the event the temperature threshold is exceeded. Accordingly, with the temperature limiting device 102 of the present disclosure and the TCO device 204, the thermal system 200 is configured to include two safety mechanisms.

The temperature limiting device of the present disclosure is adaptable to various type of a thermal system, and in some forms, may utilize an existing power switch provided in a thermal system. More particularly, referring to FIG. 3, a thermal system 300 includes a temperature limiting device 302 that includes a TWC 304 that is cascaded with a process temperature controller 306 and a power switch 308. The thermal system further includes the heater 202 and the TCO device 204.

Figure 3:
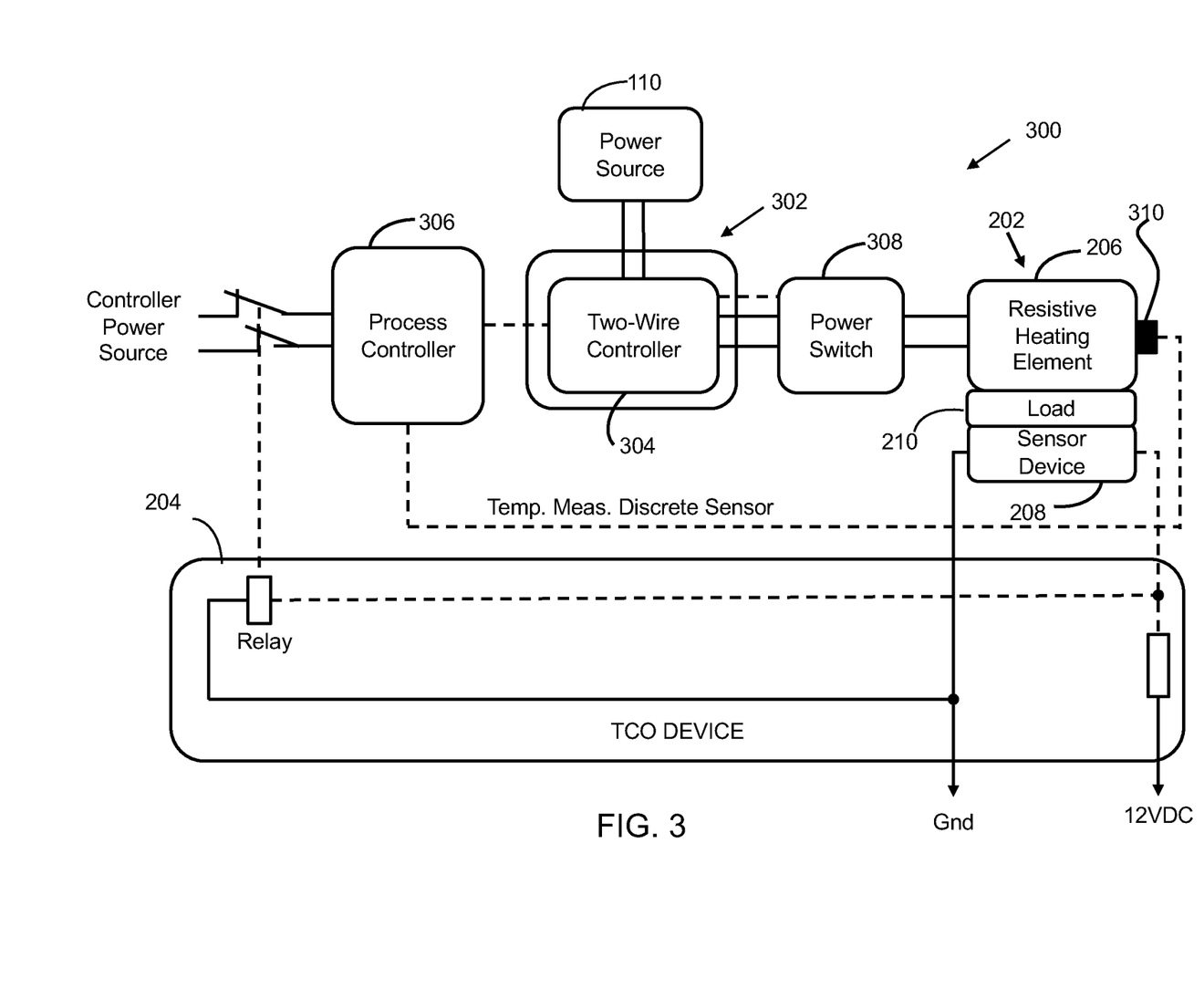
FIG. 3 illustrates a third form of a thermal system having a process controller and a temperature limiting device connected to and cascaded with an external power switch in accordance with the teachings of the present disclosure.

In one form, the process temperature controller 306 is configured to control a thermal performance of the heater 202 based on data from one or more discrete sensors. The discrete sensors can be provided throughout the thermal system 300, such as temperature sensor 310 provided at the heater 202. The thermal performance may include, but is not limited to, controlling temperature of the resistive heating element 206 and/or load 210, a thermal profile of the heater 202, and/or cooling rate and/or heating rate of the heater 202. In one form, the process temperature controller 306 is a proportional-integral-derivative (PID) controller that determines the temperature of the heater 202 and/or load 210 using data from the discrete sensors, including temperature sensor 310. Depending on the status of the control loop and the control parameters, the process temperature controller 306 outputs a control signal (e.g. 0-10V, 0-20 mA, switched DC, open collector, etc.), which is fed to the TWC 304. The TWC 304 forwards the control signal to the power switch 308, which modulates the control signal on the supply voltage (i.e., power from the power source 110), which is provided via the temperature limiting device 302.

The TWC 304 is configured to operate in a similar as the TWC 112 to measure a temperature of the thermal system 300. The TWC 304 is configured to provide a power control signal to the power switch, in lieu of the control signal from the process controller, to turn-off power to the heater 202 in response to the temperature of the thermal system being greater than the temperature setpoint.

The temperature limiting device 302 is adaptable with a thermal system having a power switch. Specifically, the temperature limiting device 302 does not interfere with the control loop being performed by the process temperature controller 306. However, if the temperature setpoint is exceeded, the temperature limiting device 302 turns-off power to the heater 202 and thus, the resistive heating element 206, thereby performing as a high limit controller.

In the thermal system 300 of FIG. 3, the temperature limiting device 302 is a separate component, and thus can be used to upgrade an existing process temperature controller 306 performing closed-loop control. With the temperature limiting device 302 being a separate component, the control signals between the process temperature controller 306 and the TWC 304 should be compatible and the power switch 308 should be compatible with the voltage-current requirements being derived from the resistive heating element 206.

Similar to the temperature limiting device 102, the temperature limiting device 302 directly measures the temperature of the resistive heating element(s) 206, and thus, increases the response time of the temperature limiting device 302 when compared to a system having discrete sensors. In addition, the temperature limiting device 302 is used as a safety relevant device to inhibit severe conditions/failures (e.g. fire). In addition to the temperature limiter mode, the temperature limiting device 302 may also be configured to include the calibration mode and/or the diagnostic mode as described above.

In one variation, in lieu of the temperature limiting device 302 and separate power switch 308, the thermal system 300 may include the temperature limiting device 102 described above. In another variation, the thermal system 300 may not include the TCO device 204 and the sensor device 208 for providing secondary safety mechanism. In yet another variation, the thermal system 100 and 200 of FIGS. 1 and 2, respectively, may include the temperature limiting device 302 and the separate power switch 308. In such configuration, the TWC 304 transmits a power control signal to the power switch 308 to activate or deactivate power to the heater 202. In addition, the TWC 304 may include the temperature control scheme described above with respect to the TWC 112.

In one form, the power switch may be integrated with a heater. More particularly, referring to FIG. 4, an in-line heater 400 including one or more resistive heating elements (not shown) is configured to heat fluid flowing through the heater 400, as represent by the dotted line. A power switch (PS) 402 is disposed at and integrated with the in-line heater 400 to transfer heat to the fluid flowing in the in-line heater 400. A sensor device 404 is provided at the in-line heater 400 for a TCO device.

Figure 4:
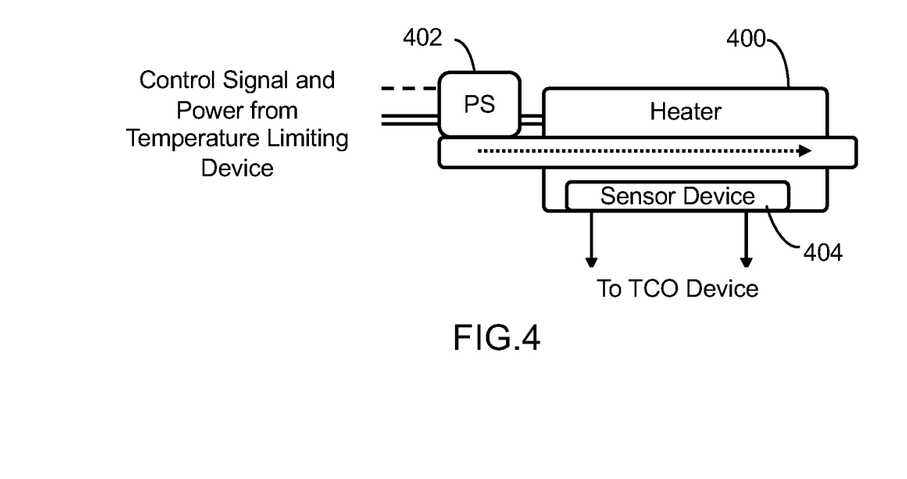
FIG. 4 illustrates an in-line heater with a power switch provided with the in-line heater in accordance with the teachings of the present disclosure.

In one form, the power switch 402 is provided at an inlet fitting of the in-line heater 400. The flow of fluid cools the power switch 402, and thus, reduces the need for an additional heat sink. That is, the heat loss of the power switch 402 not only cools the power switch 402, but is harvested to preheat the fluid through the in-line heater 400.

In one form, in using the heater 400 and the power switch 402 as part of the thermal system 300, the process temperature controller 306 measures the temperature of the fluid (liquid or gas) flowing through the in-line heater 400 using discrete sensors, such as the temperature sensor 310, located along the flow path and/or at the outlet of the heater 400. Depending on the status of the control loop and the control parameters, the process temperature controller 306 outputs a control signal (e.g. 0-10V, 0-20 mA, switched DC, open collector, etc.) which is provided to the TWC 304. The TWC 304 monitors the temperature of the thermal system 300, and if the temperature limit setpoint is not exceeded, the TWC 304 forwards the control signal to the power switch 402, which modulates this signal on the supply voltage.

Figure 5:
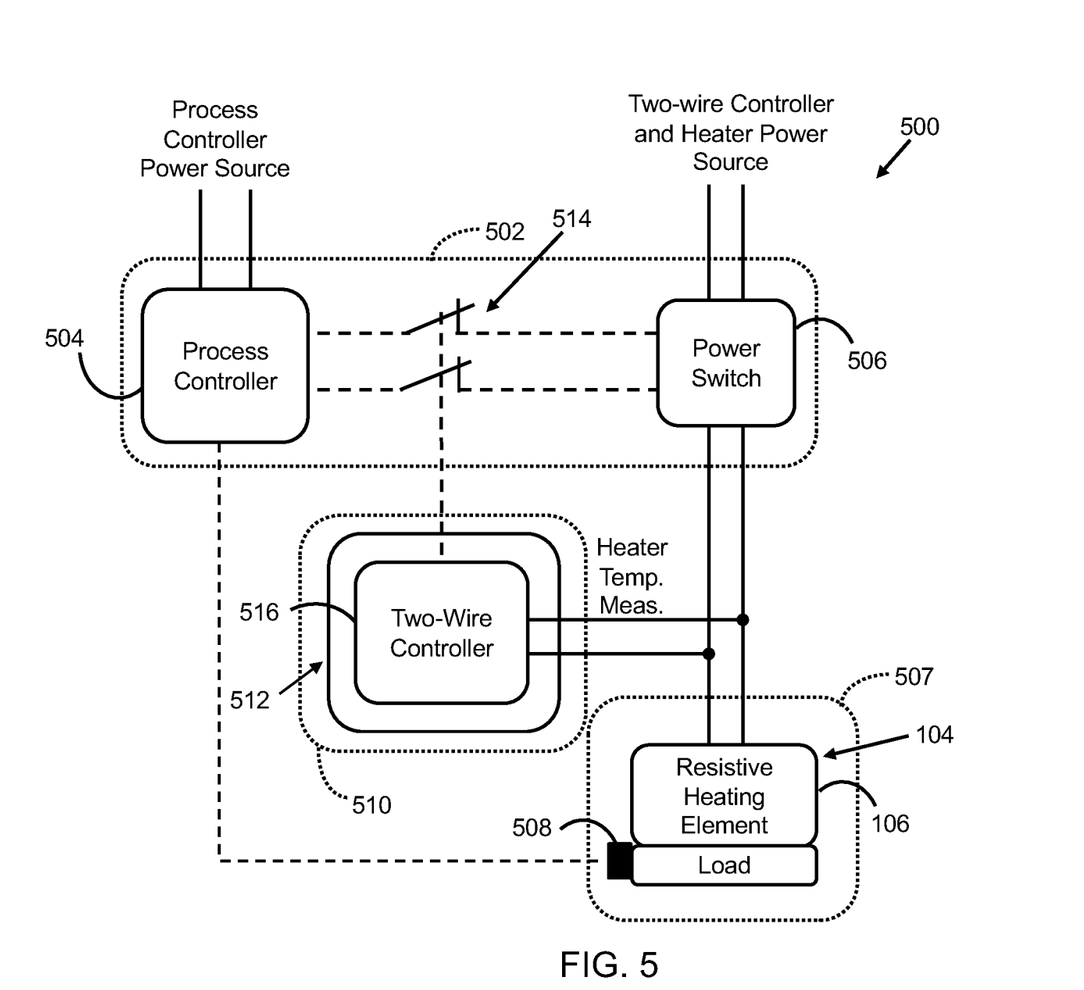
FIG. 5 illustrates a fourth form of a thermal system having a combination process controller and power switch with a temperature limiting device in accordance with the teachings of the present disclosure.

In one form, the temperature limiting device of the present disclosure is adaptable for use with a thermal system in which the process controller and the power switch are provided as a unit and the temperature limiting device is electrically coupled to power lines to the heater and is disposed in parallel with the power switch. More particularly, FIG. 5 illustrates a thermal system 500 including a first unit 502 formed by a process controller 504 and a power switch 506, a second unit 507 formed by the two-wire heater 104, the resistive heating element 106, and a discrete sensor 508, and a third unit 510 formed by the temperature limiting device 512. The first unit 502, second unit 507, and the third unit 510 are generally identified by dotted lines.

The process controller 504 is configured in a similar manner as the process temperature controller 306 for determining a control signal based on data from discrete sensors, such as the discrete sensor 508. Unlike process temperature controller 306, the process controller 504 transmits the control signal to the power switch 506 by way of a switch 514 operable by the temperature limiting device 512. In one form, the switch 514 is a transistor or relay that is configured to be normally in the closed state and is operable by the temperature limiting device 512 to decouple the process controller 504 and the power switch 506 to inhibit the transmission of the control signal.

More particularly, the temperature limiting device 512 includes a TWC 516 that is electrically coupled to power lines provided to the two-wire heater 104 to measure electrical characteristics of the two-wire heater 104. The TWC 516 is configured as a temperature limiter to turn off power to the two-wire heater 104 based on a temperature of the thermal system 500. For example, when the temperature of the thermal system 500 exceeds the temperature limit setpoint, the TWC 516 operates the switch 514 via a switch signal (e.g., 5V) to inhibit transmission of the control signal to the power switch 506.

In one variation, in lieu of the switch 514, the TWC 516 is communicably coupled to the process controller 504 and notifies the process controller 504 that the temperature of the thermal system 500 is above a temperature limit setpoint and to stop power to the two-wire heater 104. In another variation, the temperature limiting device 512 can be provided with the two-wire heater 104. Accordingly, the switch control signal to the switch 514 or the notification to the process controller 504 is configured to be compatible to existing system components (e.g., the first unit 502). The thermal system 500 does not require an integrated power switch as part of the temperature limiting device 512 and thus reduces cost and complexity of the temperature limiting device 512.

Figure 6A:
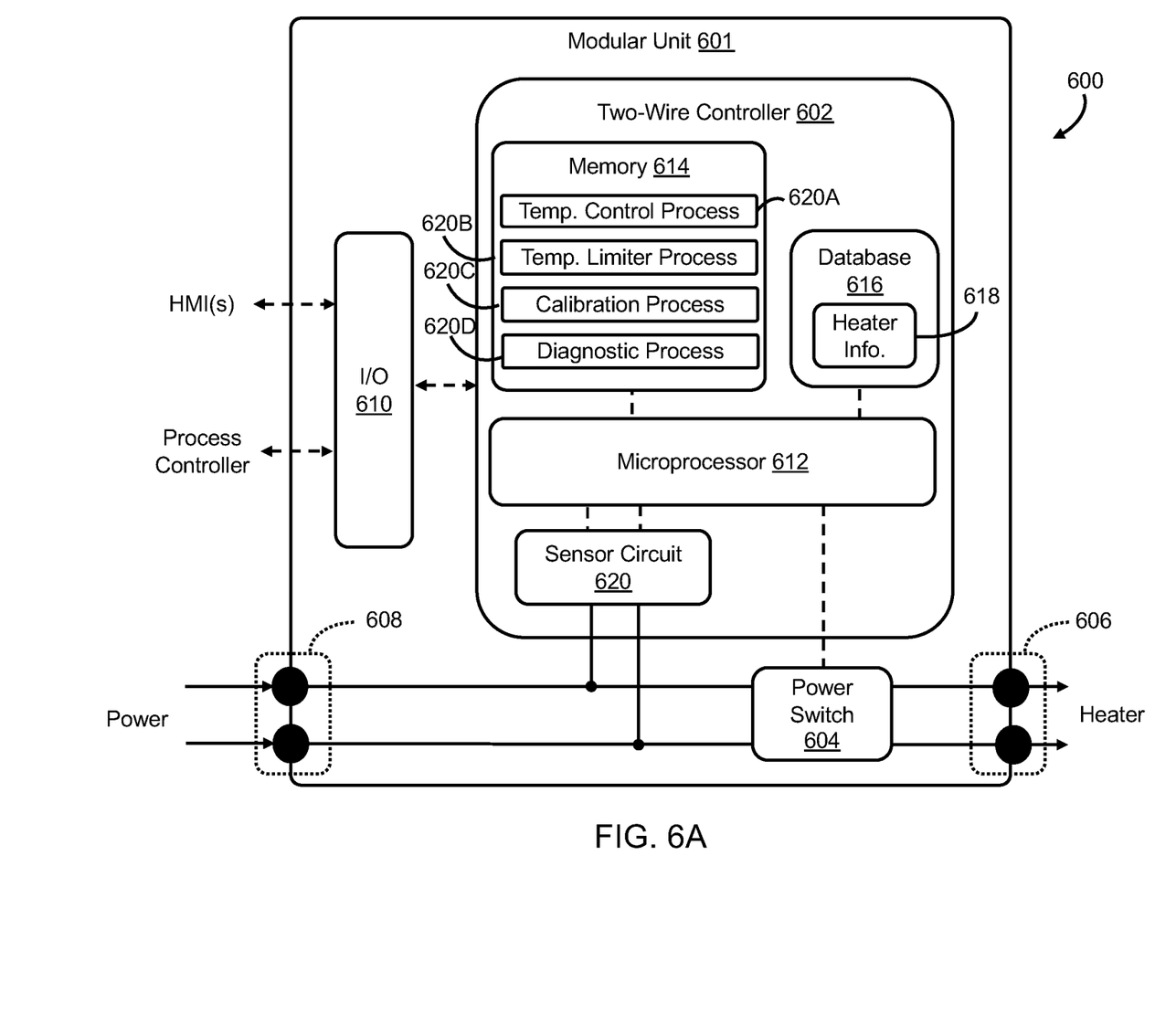
FIG. 6A is a block diagram of a temperature limiting device having a two-wire controller and a power switch.
Figure 6B:
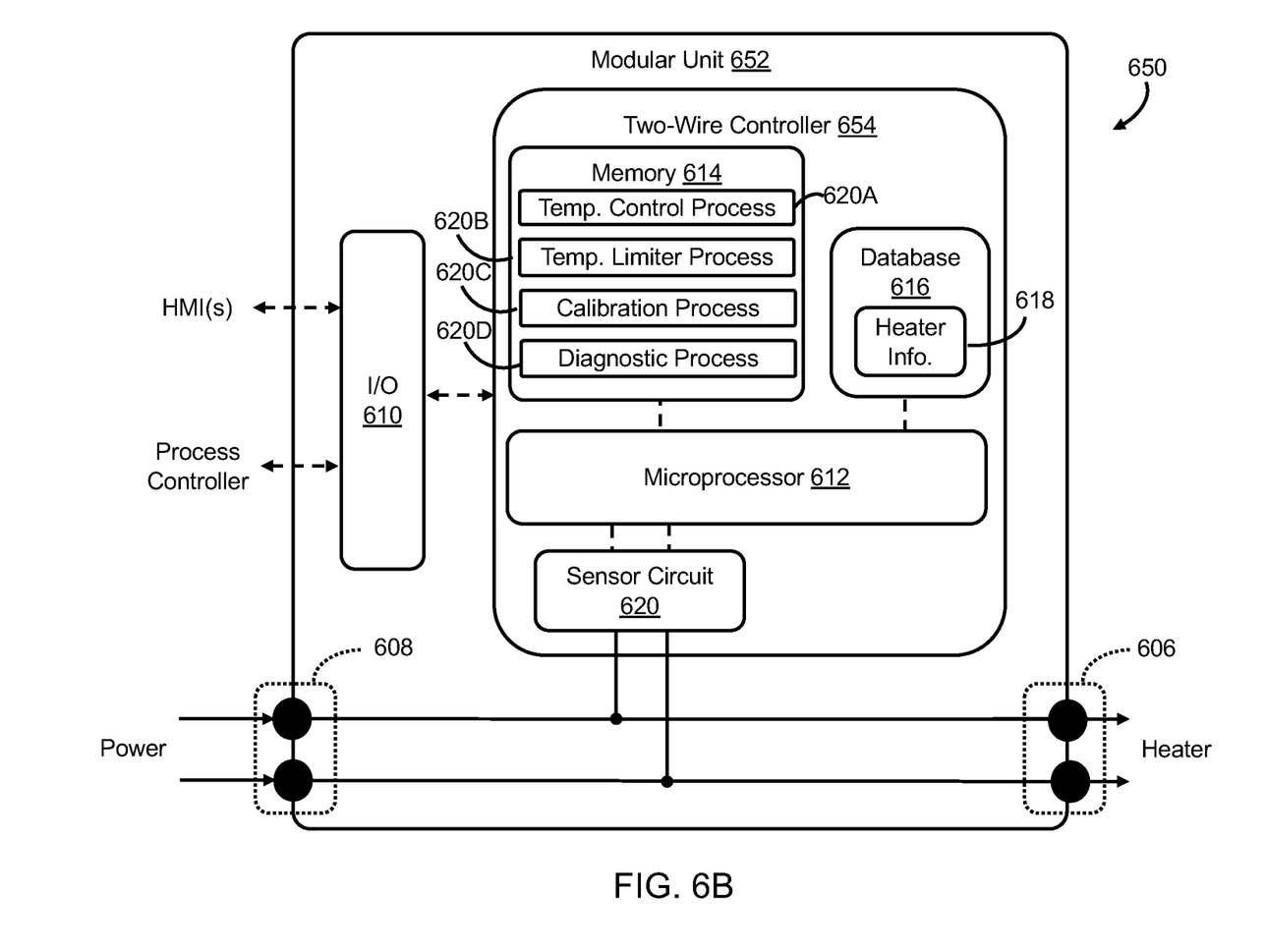
FIG. 6B is a block diagram of a temperature limiting device having a two-wire controller.

Referring to FIGS. 6A and 6B, example block diagrams of a temperature limiting devices are illustrated. FIG. 6A illustrates a temperature limiting device 600 including a modular unit 601 that includes a TWC 602 and a power switch 604 operable by the TWC 602. The modular unit 601 is a component that is adaptable to interface with a heater (e.g., two-wire heater 104, 202, or 400) of a thermal system. In one form, the modular unit 601 includes a heater interface 606, a power interface 608, and an input/output (I/O) interface 610. The heater interface 606 is configured to connect to the two-wire heater and the power interface 608 is configured to connect to a power source to receive power for the two-wire heater and for the electronics within the modular unit 601.

The TWC 602 is configured to communicate with external devices such as a process controller (e.g., process temperature controller 306), one or more human machine interface (s) (HMI(s)), among other devices, by way of the I/O interface 610. The HMI(s) allow the user to communicate with the TWC 602 and may include, but is not limited to, a keyboard, a computing device (e.g., laptop, a tablet, smart phone, etc.), mouse, and/or display. By way of the HMI(s), the user may, for example, select an operation mode of the temperature limiting device 600 (e.g., temperature control mode or a temperature limiter mode), provide heater information, and/or perform other tasks, such as calibrating heater information. It should be readily understood that the TWC 602 is not required to communicate with the HMI(s) and/or the process controller of the thermal system. In addition, if communication with external devices is not required, the modular unit 601 may not include the I/O interface 610.

In one form, the TWC 602 is configured to include a microprocessor 612, a memory 614 that stores software programs (i.e., computer readable instructions) executable by the microprocessor 612, and a database 616 that stores heater information 618 used for determining the temperature of the thermal system and/or performance characteristics of the heater, as described above. The memory 614 includes a temperature (temp.) control process 620A for having the TWC 602 operate in the temperature control mode, a temperature limiter process 620B for having the TWC 602 operate in the temperature limiter mode, a calibration process 620C for having the TWC 602 operate in the calibration mode, and a diagnostic process 620D for having the TWC 602 operate in the diagnostic mode. It should be readily understood the TWC 602 is not required to include all of the processes 620A to 620D, and that the TWC 602 is customizable to include one or more of the processes described herein.

The TWC 602 further includes a sensor circuit 620 that is electrically coupled to the heater via the heater interface 606 to measure the electrical characteristics of the heater or more particularly, the resistive heating element. In one form, if the heater is a R-T heater, the sensor circuit 620 may include a current sensor and/or voltage sensor for measuring current and voltage applied to the resistive heating element. If the heater is a TSPP-heater, the sensor circuit 620 may include a voltage sensor for measuring a change in voltage at the temperature sensing junction. Accordingly, the sensor circuit may be configured in various suitable ways based on the two-wire heater.

The temperature limiting device 600 includes the integrated power switch 604 that controls power to the heater based on a signal from the TWC 602. In one form, the power switch 604 is disposed between the heater interface 606 and the power interface 608. The temperature limiting device 102 may be configured as the temperature limiting device 600.

FIG. 6B illustrates a temperature limiting device 650 that includes a modular unit 652 that includes a TWC 654, the I/O interface 610, the heater interface 606, and the power interface 608. Here, the temperature limiting device 650 controls power to the heater by way of an external r switch (e.g., power switch 308, power switch 402, switch 514). In one form, the TWC 654 is configured to communicate with the external switch via a power switch interface that can be part of the I/O interface 610 or a discrete interface similar to that of the heater interface 606 and the power interface 608. Accordingly, the TWC 654 may also communicate with a switch for controlling communication between the process controller and the external power switch (e.g., the thermal system 500 of FIG. 5) and/or the external power switch (e.g., the thermal system 300 of FIG. 3 or combination of the thermal system 300 with the power switch 402 of FIG. 4). Thus, the temperature limiting device 302 and 512 may be configured as the temperature limiting device 650.

In the event the heater includes multiple heating elements that are independently controller, the modular units 601 and 652 may include multiple heater interfaces 606, power switches 604, and sensor circuits 620 for performing the operations described herein. Furthermore, during the temperature limiting mode, the TWC 602, 654 may be configured to turn-off power to all the heating elements or to just the heating elements exceeding respective threshold. While specific components are provided, the modular units 601 and 652 may include other components for providing an adaptive device that can be installed in new and existing thermal systems. For example, the modular unit 601 may include such as one or more housings, wiring, and/or circuits. In one form, the modular units 601 and 652 may include a power circuit for reducng power from the power source for electronic components within the modular unit.

As provided above, the heater 104, 202, 400 may have temperature sensing power pins for providing power and measuring a temperature of the heater. For example, referring to FIG. 7, the heater may be a cartridge heater 700 that includes a resistive heating element 702 having two end portions 704 and 706. In one form, the resistive heating element 702 is in the form of a metal wire, such as a nichrome material by way of example, and is wound or disposed around a non-conductive portion (or core 708) that is surrounded by a sheath 709. The core 708 defines a proximal end 710 and a distal end 712 and further defines first and second apertures 714 and 716 extending through at least the proximal end 710.

Figure 7:
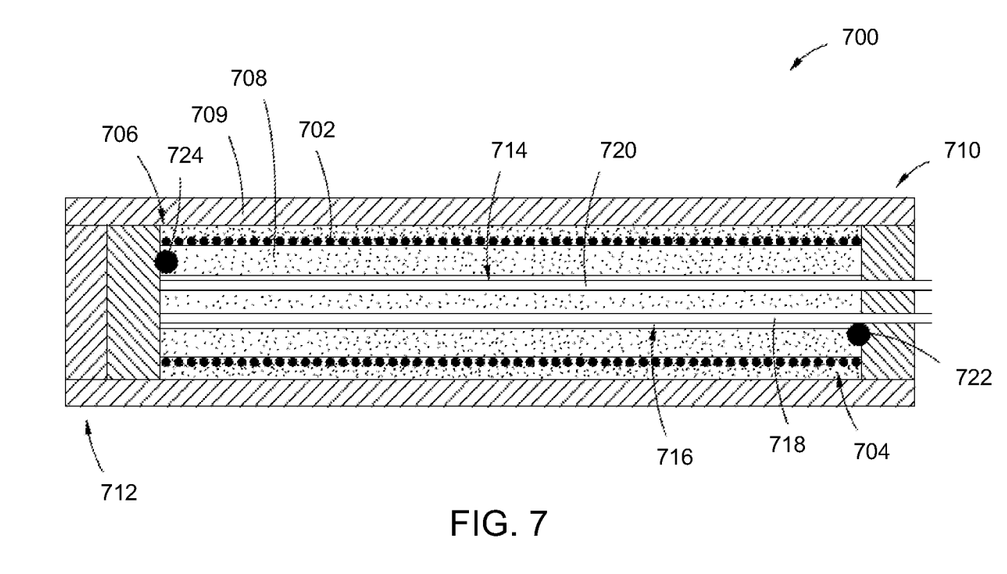
FIG. 7 is an example of a cartridge heater having temperature sensing power pins.

The cartridge heater 700 further comprises a first power pin 718 that is made of a first conductive material and a second power pin 720 that is made of a second conductive material that is dissimilar from the first conductive material of the first power pin 718 (i.e., the first and second conductive materials have different Seebeck coefficients). Further, the resistive heating element 702 is made of a material that is different from the first and second conductive materials of the first and second power pins 718, 720 and forms a first junction 722 at end portion 704 with the first power pin 718 and a second junction 724 at its other end 706 with the second power pin 720. Because the resistive heating element 702 is a different material than the first power pin 718 at first junction 722 and is a different material than the second power pin 720 at second junction 724 (i.e., the first and second conductive materials have different Seebeck coefficients than the resistive heating element), a thermocouple junction is effectively formed. Accordingly, changes in voltage at the first and second junctions 722, 724 are detected to determine an average temperature of the cartridge heater 700 without the use of a separate/discrete temperature sensor.

Additional detail regarding the temperature sensing power pins is provided in Applicant's co-pending applications having U.S. Ser. No. 14/725,537, filed May 29, 2015 and titled "RESISTIVE HEATER WITH TEMPERATURE SENSING POWER PINS" and U.S. Ser. No. 15/950,358 filed Apr. 11, 2018 and titled "RESISTIVE HEATER WITH TEMPERATURE SENSING POWER PINS AND AUXILIARY SENSING JUNCTION." These applications are incorporated herein by reference in their entirety, and disclose a heater having one or more resistive heating elements that are connected to power pins that function as a thermocouple sensing pins to measure the temperature of the resistive heating element. Accordingly, for a TSPP heater, the TWC 112, 304, 516 of the temperature limiting device 102, 302, 512 is configured to measure changes in voltage (mV) at the junctions formed by the heater resistive element and the power pins, and to calculate an average temperature of the resistive heating element. For example, using looks-up tables and/or predefined algorithm, the TWC 112, 304, 516 may perform a thermal couple conversion (mV to Temp.), and/or cold-junction compensation to determine the temperature of the heating element. If the temperature exceeds a threshold, the TWC 112, 304, 516 can turn-off power to the heating element using the various methods described herein. The temperature sensing power pins may be used with other heaters, such a fluid line heater(s), a fluid immersion heater(s), or other suitable heaters, and should not be limited to cartridge heaters.

The process controller of the present disclosure is described as a PID controller, but the controller may be configured as other suitable controller such as a model-based controller, an open loop controller, etc. When configured as a model-based control, the process controller controls the operation of the heater based on various parameters, such as, but not limited to: power, rate control, thermal profile, boost control using heater-load correlation, and other suitable parameters.

The description of the disclosure is merely exemplary in nature and, thus, variations that do not depart from the substance of the disclosure are intended to be within the scope of the disclosure. Such variations are not to be regarded as a departure from the spirit and scope of the disclosure.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, manufacturing technology, and testing capability.

As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information, but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, the term "controller" may be replaced with the term "circuit". The controller may be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The term code may include software, firmware, and/or microcode, and may refer to programs, routines, functions, classes, data structures, and/or objects. The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory.

What is claimed is:
1. A temperature limiting device for a thermal system, the temperature limiting device comprising:
    a modular unit comprising:
        a heater interface configured to connect to a two-wire heater of the thermal system;
        a power interface configured to connect to a power source to receive power;
        an input/output interface configured to communicate with one or more external devices, wherein the one or more external devices includes a process controller of the thermal system; and
        a controller including a sensor circuit, wherein:
            the sensor circuit is configured to measure an electrical characteristic of the two-wire heater, wherein the electrical characteristic includes voltage, current, or a combination thereof, and the controller is configured to calculate a temperature of the thermal system, wherein the calculation is based on a change in the measured electrical characteristic and determine whether the temperature is greater than a temperature setpoint.

2. The temperature limiting device of claim 1, wherein:
the modular unit further comprises a power switch interface to connect to a power switch at the thermal system, and
the controller is configured to operate the power switch to turn off power to the two-wire heater in response to the temperature of the thermal system being greater than the temperature setpoint.

3. The temperature limiting device of claim 1, wherein the modular unit further comprises a power switch electrically coupled between the power interface and the heater interface and operable by the controller to control power to the two-wire heater.

4. The temperature limiting device of claim 3, wherein the controller is configured to turn off power to the two-wire heater via the power switch in response to the temperature of the thermal system being greater than the temperature setpoint.

5. The temperature limiting device of claim 1, wherein:
the controller stores predefined heater information that associates temperature values of the two-wire heater with performance characteristic measurements of the two-wire heater, wherein the controller is configured to determine a performance characteristic based on the measured electrical characteristic; and
the controller is configured to determine, as the temperature of the thermal system, a temperature of the two-wire heater, a temperature of a load being heated by the two-wire heater, or a combination thereof based on the determined performance characteristic and the predefined heater information.

6. The temperature limiting device of claim 5, wherein the two-wire heater has a varying temperature coefficient of resistance, and the performance characteristic is a resistance of the two-wire heater at a temperature.

7. The temperature limiting device of claim 5, wherein the heater interface is connected to the two-wire heater by way of a temperature sensing power pins that define a temperature sensing junction at the heater, wherein the sensor circuit measures voltage at the temperature sensing junction and the performance characteristic is a change in voltage at the temperature sensing junction.

8. The temperature limiting device of claim 1, wherein the controller is configured to calculate, as the temperature of the thermal system, a temperature of the two-wire heater, a temperature of a load being heated by the two-wire heater, or a combination thereof.

9. A thermal system comprising:
a two-wire heater including two terminals;
a process controller configured to control thermal performance of the two-wire heater based on data from one or more discrete sensors;
a power switch operable to provide power to the two-wire heater based on a control signal from the process controller; and
a temperature limiting device separate from the process controller, wherein the temperature limiting device comprises:
a modular unit that comprises:
a heater interface configured to connect to a two-wire heater of the thermal system;
a power interface configured to connect to a power source to receive power;
an input/output interface configured to communicate with the process controller; and
a controller including a sensor circuit, wherein:
the sensor circuit is configured to measure an electrical characteristic of the two-wire heater, wherein the electrical characteristic includes voltage, current, or a combination thereof,
the controller is configured to calculate a temperature of the thermal system based on the measured electrical characteristic, an offset, and a temperature based on the two-wire heater and determine whether the temperature is greater than a temperature setpoint, and
the controller is configured to operate the power switch to turn-off power to the two-wire heater in response to the temperature of the thermal system being greater than the temperature setpoint.

10. The thermal system of claim 9, wherein:
the controller of the temperature limiting device stores predefined heater information that associates temperature values of the two-wire heater with performance characteristic measurements of the two-wire heater, wherein the controller is configured to determine a performance characteristic based on the measured electrical characteristic, and
the controller is configured to determine, as the temperature of the thermal system, a temperature of the two-wire heater, a temperature of a load being heated by the two-wire heater, or a combination thereof based on the determined performance characteristic and the predefined heater information.

11. The thermal system of claim 10, wherein the two-wire heater has a varying temperature coefficient of resistance, and the performance characteristic is a resistance at a temperature of the two-wire heater.

12. The thermal system of claim 10, wherein:
the two terminals of the two-wire heater include temperature sensing power pins that define a temperature sensing junction, and
the sensor circuit is configured to measure voltage at the temperature sensing junction and the performance characteristic as a change in voltage at the temperature sensing junction.

13. The thermal system of claim 9, wherein the temperature limiting device is coupled in series with the process controller and the power switch, and the temperature limiting device is configured to transfer the control signal from the process controller to the power switch.

14. The thermal system of claim 9, wherein the temperature limiting device is arranged in parallel with the power switch to detect the electrical characteristic of the two-wire heater.

15. The thermal system of claim 9, wherein the modular unit includes the power switch.

16. The thermal system of claim 9, wherein:
the two-wire heater is an in-line heater that heats fluid flowing therein,
the power switch is disposed at and integrated with the in-line heater to transfer heat to the fluid flowing in the in-line heater; and
the temperature limiting device is disposed separately from the two-wire heater and the power switch, and the modular unit includes a power switch interface to connect to the power switch.

17. The thermal system of claim 9 further comprising:
a thermal cut-off circuit including a relay coupled to a power line to the two-wire heater; and
a discrete sensor, wherein
the two-wire heater is a layered heater that has a resistive heating layer,
the discrete sensor is configured to measure a temperature of the heater, and
the thermal cut-off circuit is configured to turn-off power to the two-wire heater via the relay when the temperature of the heater is greater than a cut-off temperature setpoint.

18. A temperature limiting device for a thermal system, the temperature limiting device comprising:
a modular unit comprising:
a heater interface configured to connect to a two-wire heater of the thermal system;
a power interface configured to connect to a power source to receive power;
a power switch disposed between the heater interface and the power interface to control power to the two-wire heater;
an input/output interface configured to communicate with one or more external devices, wherein the one or more external devices includes a process controller of the thermal system; and
a controller including a sensor circuit, wherein:
the sensor circuit is configured to measure an electrical characteristic of the two-wire heater, wherein the electrical characteristic includes voltage, current, or a combination thereof, and
the controller is configured to calculate a temperature of the thermal system, wherein the calculation is based on a change in the measured electrical characteristic and predefined heater information, determine whether the temperature is greater than a temperature setpoint, and turn off power to the two-wire heater via the power switch in response to the temperature of the thermal system being greater than the temperature setpoint.

19. The temperature limiting device of claim 18, wherein the controller is configured to calculate, as the temperature of the thermal system, a temperature of the two-wire heater, a temperature of a load being heated by the two-wire heater, or a combination thereof.

20. The temperature limiting device of claim 18, wherein the controller is configured to operate in a temperature limiting mode to turn-off power to the two-wire heater when the temperature of the thermal system is greater than the temperature setpoint and in a temperature control mode to selectively apply power to the two-wire heater via the power switch to control the temperature of the thermal system to a temperature control setpoint.

* * * * *